(12) United States Patent
Dong

(10) Patent No.: US 6,384,725 B1
(45) Date of Patent: May 7, 2002

(54) AUTOMATIC LASER DETECTING SURVEYOR'S ROD

(76) Inventor: Dawei Dong, 44121 S. Grimmer Blvd., Fremont, CA (US) 94538

( * ) Notice: Subject to any disclaimer, the term of this patent is extended or adjusted under 35 U.S.C. 154(b) by 32 days.

(21) Appl. No.: 09/675,564

(22) Filed: Sep. 29, 2000

(51) Int. Cl.[7] .............................................. G08B 21/00
(52) U.S. Cl. .................. 340/540; 340/545.3; 340/686.1
(58) Field of Search .............................. 340/540, 545.3, 340/545.6, 555, 686.1, 686.2

(56) References Cited

U.S. PATENT DOCUMENTS

| | | | | |
|---|---|---|---|---|
| 6,176,587 B1 | * | 1/2001 | Fredericks | 359/843 |
| 6,252,505 B1 | * | 6/2001 | Bade | 340/540 |
| 6,288,643 B1 | * | 9/2001 | Lerg et al. | 340/540 |
| 6,310,548 B1 | * | 10/2001 | Stephens et al. | 340/540 |
| 6,331,816 B1 | * | 12/2001 | Myllymaki | 340/540 |

* cited by examiner

Primary Examiner—Daryl Pope
(74) Attorney, Agent, or Firm—The Kline Law Firm

(57) ABSTRACT

An automatic laser detecting surveyor's rod includes a normal surveyor's rod with an automatic laser beam search unit included. When the device is activated, the search unit moves up and down the surveyor's rod until the unit detects the level of the laser beam. When the beam is detected, an alarm sounds and a digital display shows the height of the beam at the detection point. The device can be made to include a limit means for the number of passes the search unit makes without detecting the beam. If the number of passes is exceeded, the device is deactivated to save power. The user may also choose to slow the travel speed of the search unit by moving it manually.

8 Claims, 7 Drawing Sheets

AUTOMATIC LASER DETECTING SURVEYOR'S ROD

BACKGROUND OF THE INVENTION

1. Field of the Invention

The present invention relates generally to surveying instruments, and more particularly is a surveyor's rod with means to automatically determine the height of a laser level line.

2. Description of the Prior Art

Surveying equipment has in the recent past made wide utilization of laser technology. In place of simple visual sighting, surveyors and construction workers now make use of level lines generated by laser. This method is more accurate than visual sighting, and is generally quite convenient and effective. The standard procedure involves having a first operator who activates the laser level, and a second operator who determines the level of the laser beam plane.

However, in order to protect the vision of the operators, the laser beam generated is of relatively low power. Therefore the beam becomes very difficult to see when used outside in daylight conditions. Accordingly, the second operator must use a laser detector to determine the level of the laser beam. The operator simply moves the detector up and down until the detector detects the level of the beam. Since the beam is invisible to the operator, a good deal of chance is involved in the detection of the beam. This significantly increases the time required to find the laser plane, and reduces the effectiveness of the laser-aided sighting method.

Accordingly, it is an object of the present invention to provide a surveyor's rod with an automatic means of laser beam detection.

It is a further object of the present invention to provide a laser beam detection method that can be used in any ambient light situation.

It is a still further object of the present invention to provide a detector that provides both audible and visual signals of the level of the laser beam.

SUMMARY OF THE INVENTION

The present invention is an automatic laser detecting surveyor's rod. The device includes a normal surveyor's rod with an automatic laser beam search unit included. When the device is activated, the search unit moves up and down the surveyor's rod until the unit detects the level of the laser beam. When the beam is detected, an alarm sounds and a digital display shows the height of the beam at the detection point.

The device can be made to include a limit means for the number of passes the search unit makes without detecting the beam. If the number of passes is exceeded, the device is deactivated to save power. The user may also choose to slow the travel speed of the search unit by moving it manually.

An advantage of the present invention is that it makes it much easier to locate a laser level beam in bright light conditions.

Another advantage of the present invention is that only one operator is required to operate the device.

A still further advantage of the present invention is that it provides a fast and economical means of sighting a level line.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

The present invention is an automatic laser detecting surveyor's rod 3. The surveyor's rod 3 is used in conjunction with a laser level line generator 1. The laser level 1 generates a laser beam plane that is parallel to the surface upon which the laser level 1 rests. Inside, or with dim ambient light, the user can clearly see the plane generated by the laser level 1. However, outside, in bright ambient light, the laser beam plane becomes invisible, or nearly invisible, to the naked eye. Accordingly, the automatic laser detecting surveyor's rod 3 of the present invention includes a laser beam detection means.

Figure 1:
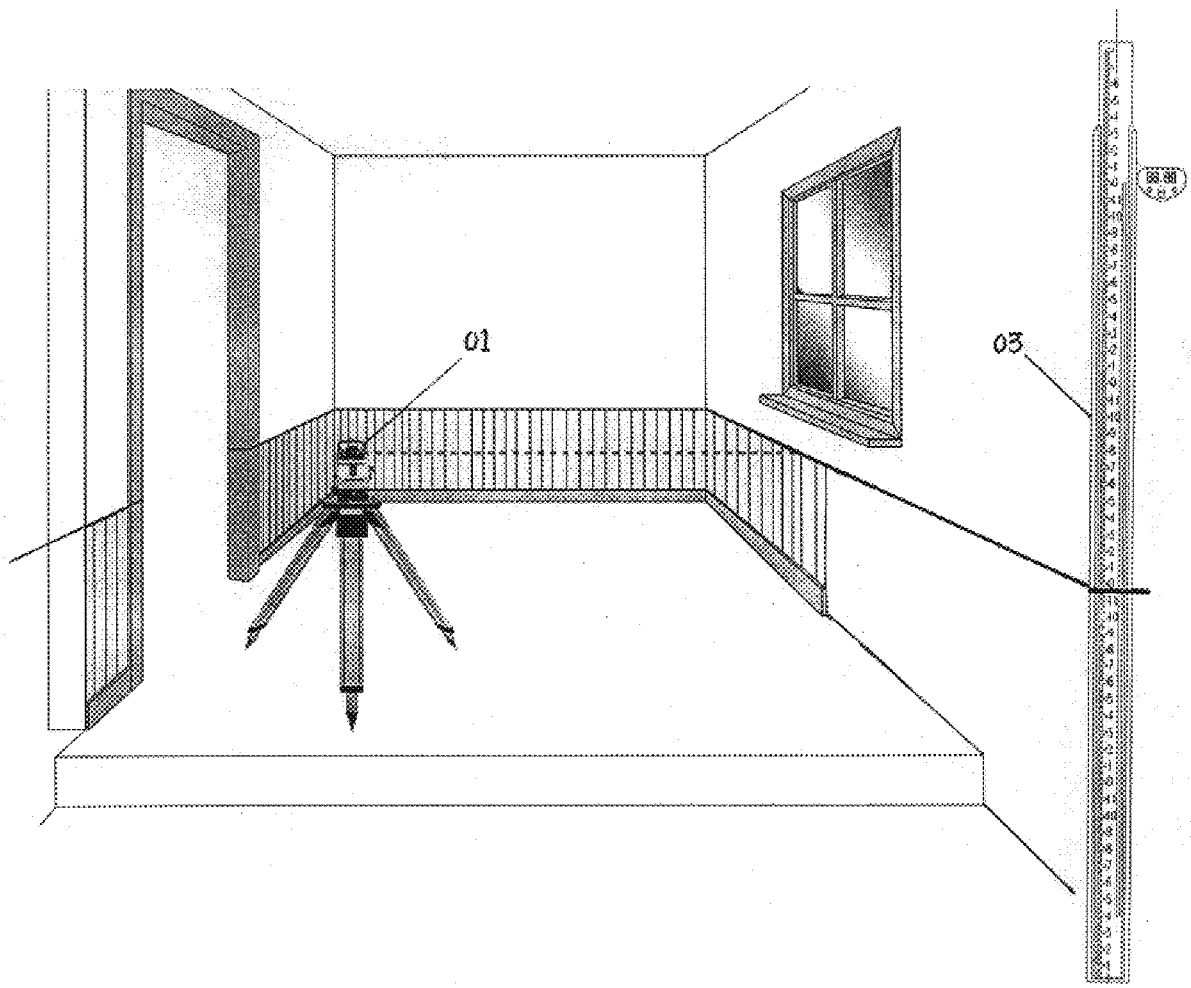
FIG. 1 is a perspective view of the automatic laser detecting surveyor's rod utilized in a typical application.
Figure 2:
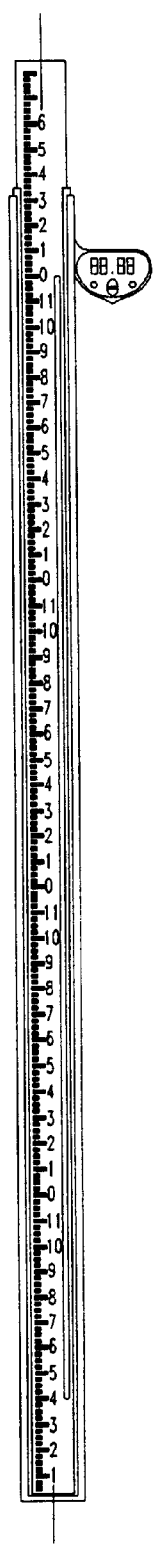
FIG. 2 is a front view of the automatic laser detecting surveyor's rod.
Figure 3:
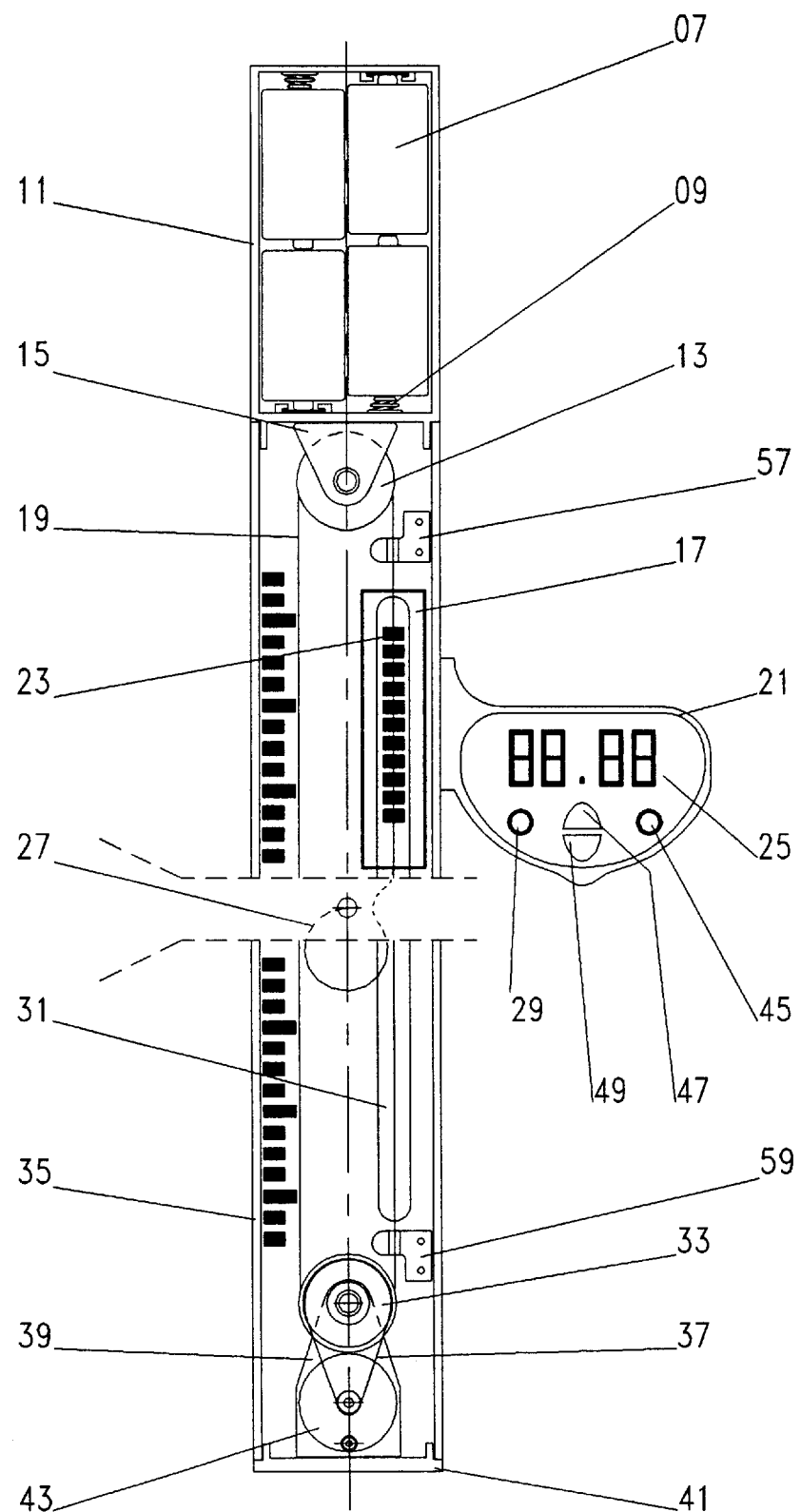
FIG. 3 is a broken front view of the surveyor's rod.
Figure 4:
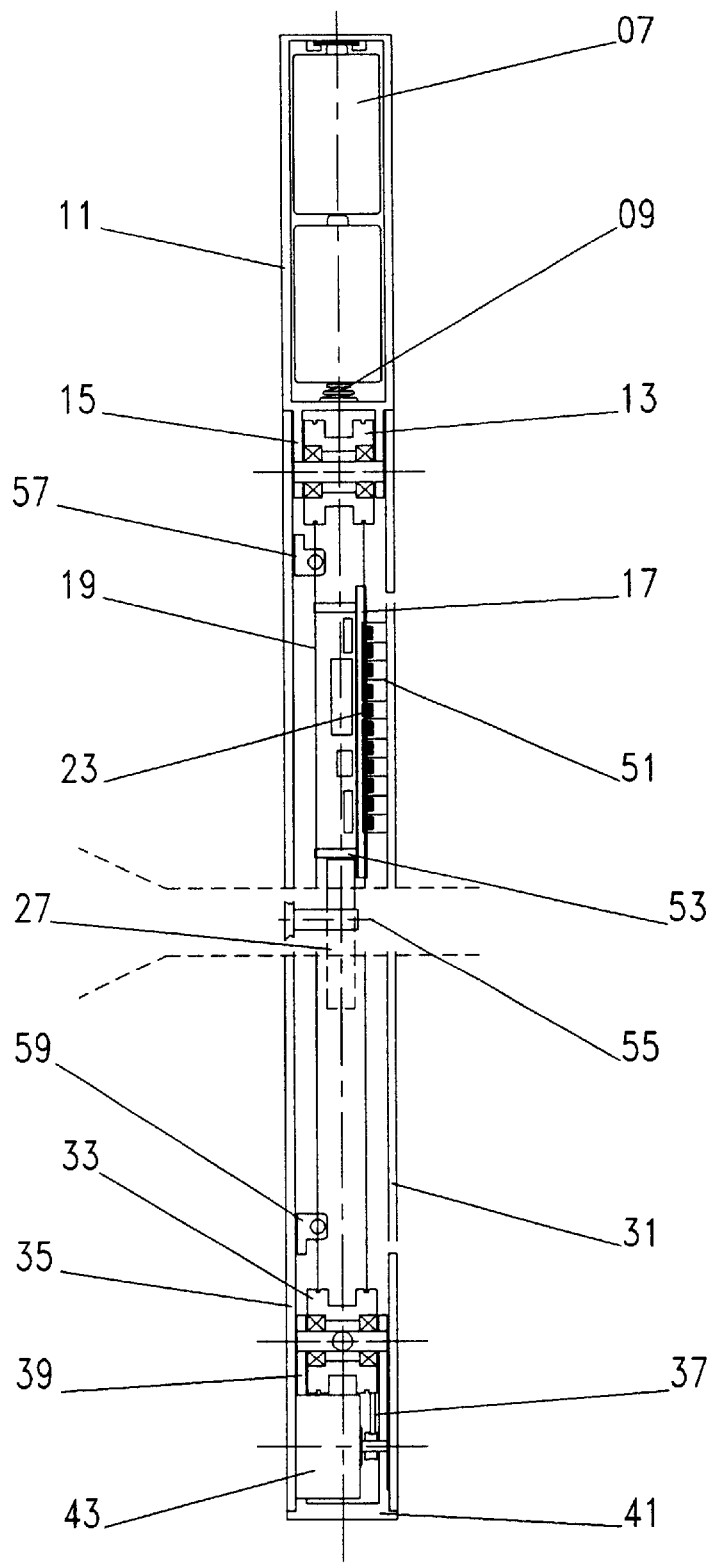
FIG. 4 is a broken side view of the surveyor's rod.

FIGS. 3 and 4 illustrate the mechanics of the present invention. In the preferred embodiment, the surveyor's rod 3 is powered by a power module 85 that includes four batteries 7 installed in a battery case 11 at an upper end of the surveyor's rod 3. Springs 9 hold the batteries in place, and provide electrical contacts.

A search unit 17 includes a laser detector comprising a plurality of laser beam sensors 23. The search unit 17 is mounted on a stainless steel wire 19. The wire 19 is looped around an upper pulley 13 and a lower pulley 33. The upper pulley 13 and the lower pulley 33 are mounted respectively on an upper pulley support 15 and a lower pulley support 39. The search unit 17 is driven by an electrical motor 43 mounted on the bottom 41 of the surveyor's rod 3. A speed-reducing belt 37 is used to control the speed of rotation of the wire 19. The travel path of the search unit 17 is defined by an upper limit switch 57 and a lower limit switch 59. A window 31 that coincides with the travel path of the search unit 17 allows light to reach the sensors 23. The window 31 is covered with a filtering material that allows laser light to pass through. A shutter 51 situated in front of the sensors 23 blocks interfering sunlight.

The electrical system of the device includes a flex cable 27 that transmits a light signal generated by the sensors 23 to a central connector 55. The central connector 55 is in communication with a display box 21 and the controlling circuitry of the device.

The display box 21 includes a digital display 25, an on/off switch 45, and a reset button 29. The display box further includes a manual control means, with a manual up button 47 and a manual down button 49. The manual controls allow the user to move the search unit up and down as desired, without the automatic search mode being activated.

Figure 5:
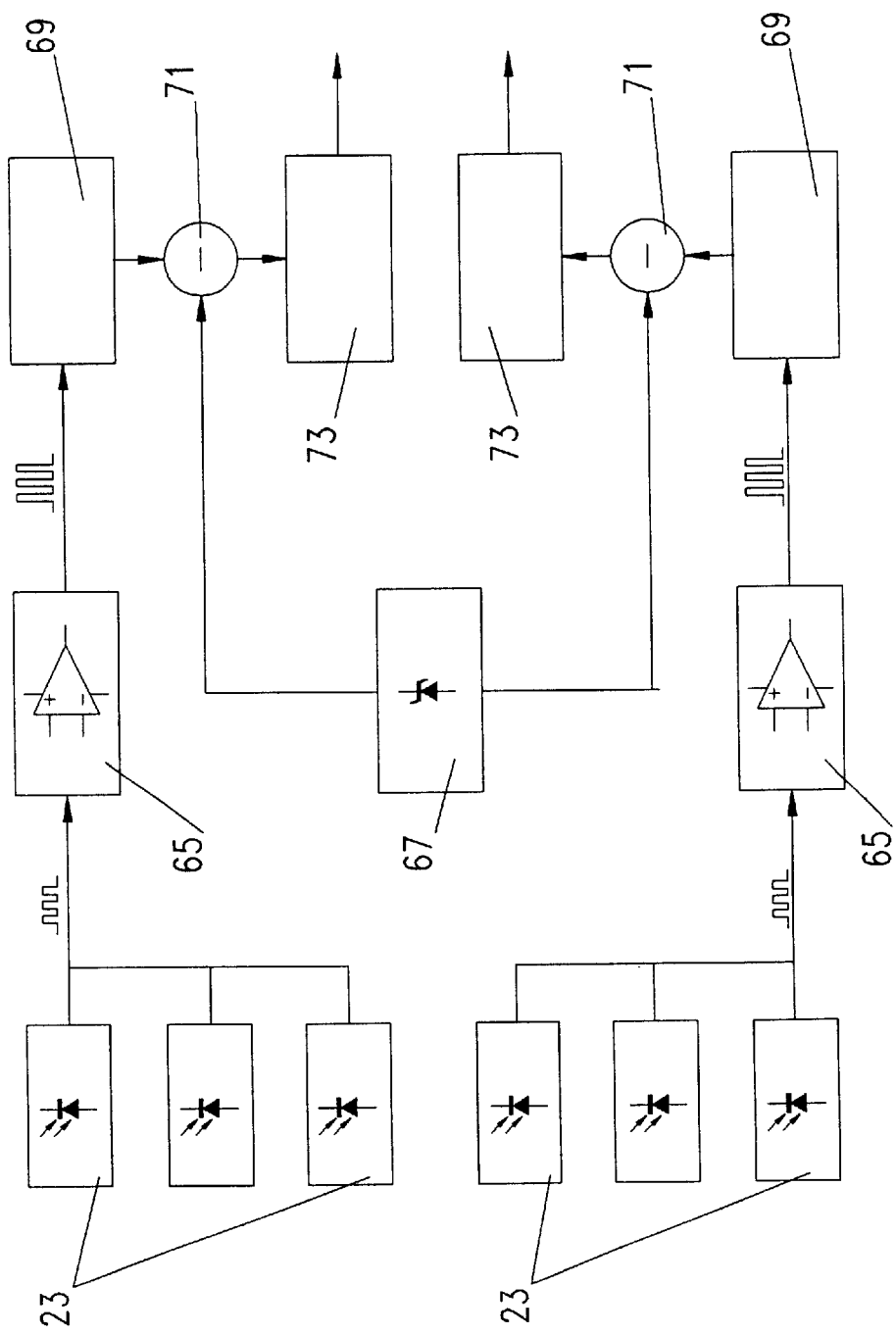
FIG. 5 shows a block diagram of the circuitry for the laser detector unit.
Figure 6:
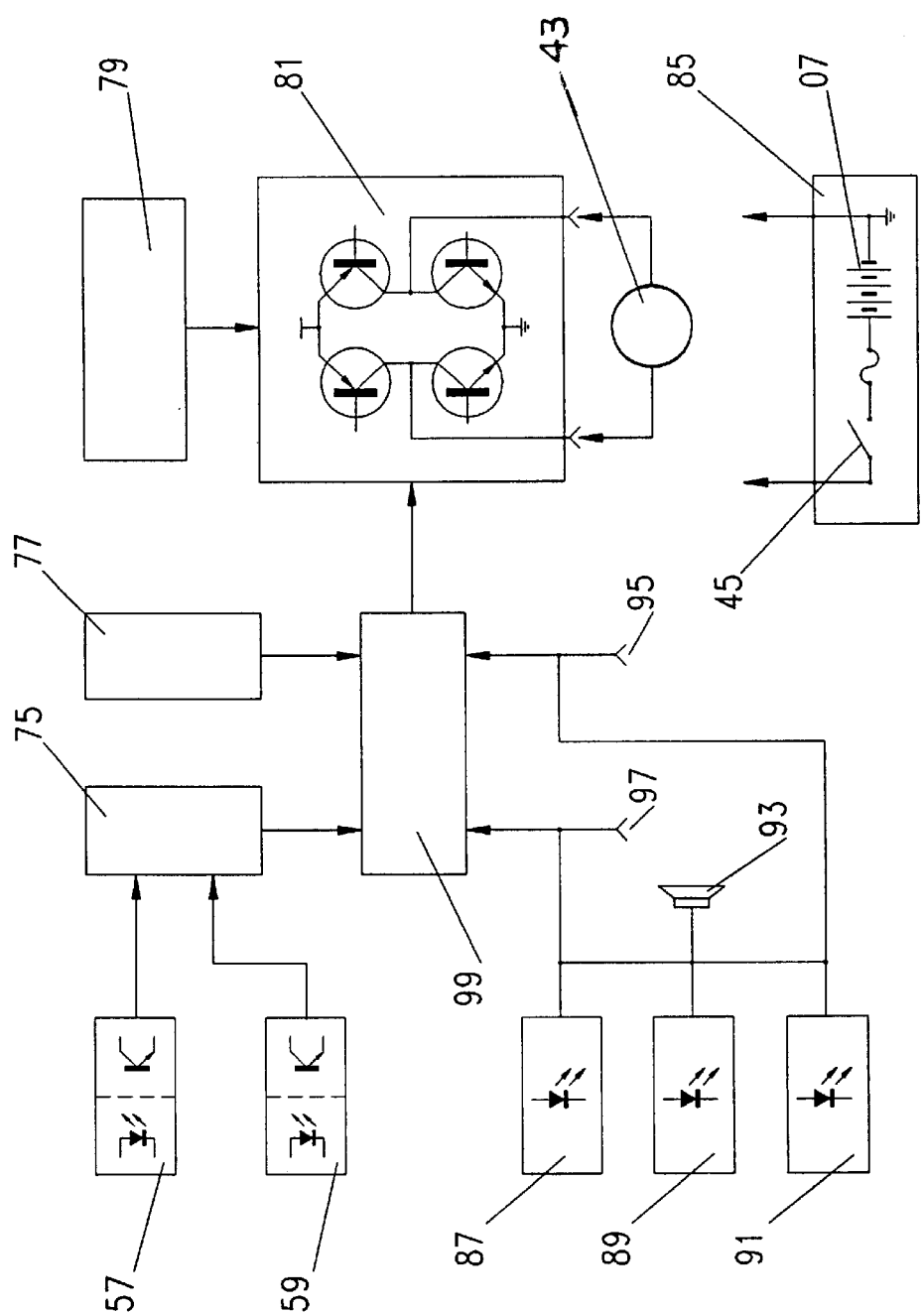
FIG. 6 shows a block diagram of the circuitry for the motor control and alarm circuits.

Referring now generally to FIG. 5, in the preferred embodiment, two banks of three sensors 23 are utilized. Each bank of sensors 23 outputs a detected voltage proportional to a current generated when the sensors 23 are struck by laser light. The detected voltage signal is first processed through an operational amplifier 65 and then through a filtering rectifier 69. The detected voltage signal is then compared in a comparator 71 to a reference voltage produced by voltage generator 67. If laser light is detected, the signal is sent through an operational amplifier 73 to activate the alarm circuit. As shown in FIG. 6, the alarm circuit comprises an LED display, which in the preferred embodiment is formed from three LED's 87, 89, 91. The alarm circuit in the preferred embodiment also includes an audible alarm 93.

FIG. 6 also illustrates the circuitry required for the automatic search feature of the device. The detected voltage and the reference voltage are fed to an automatic search controller 99 in communication with H bridge circuit 81. The H bridge circuit 81 is protected by limit circuit 79. If limit circuit 79 detects a current stronger than 1.0 A, the device is deactivated. The direction of rotation of the motor 43 is determined by limit switches 57, 59 and change-over circuit 75.

Figure 7:
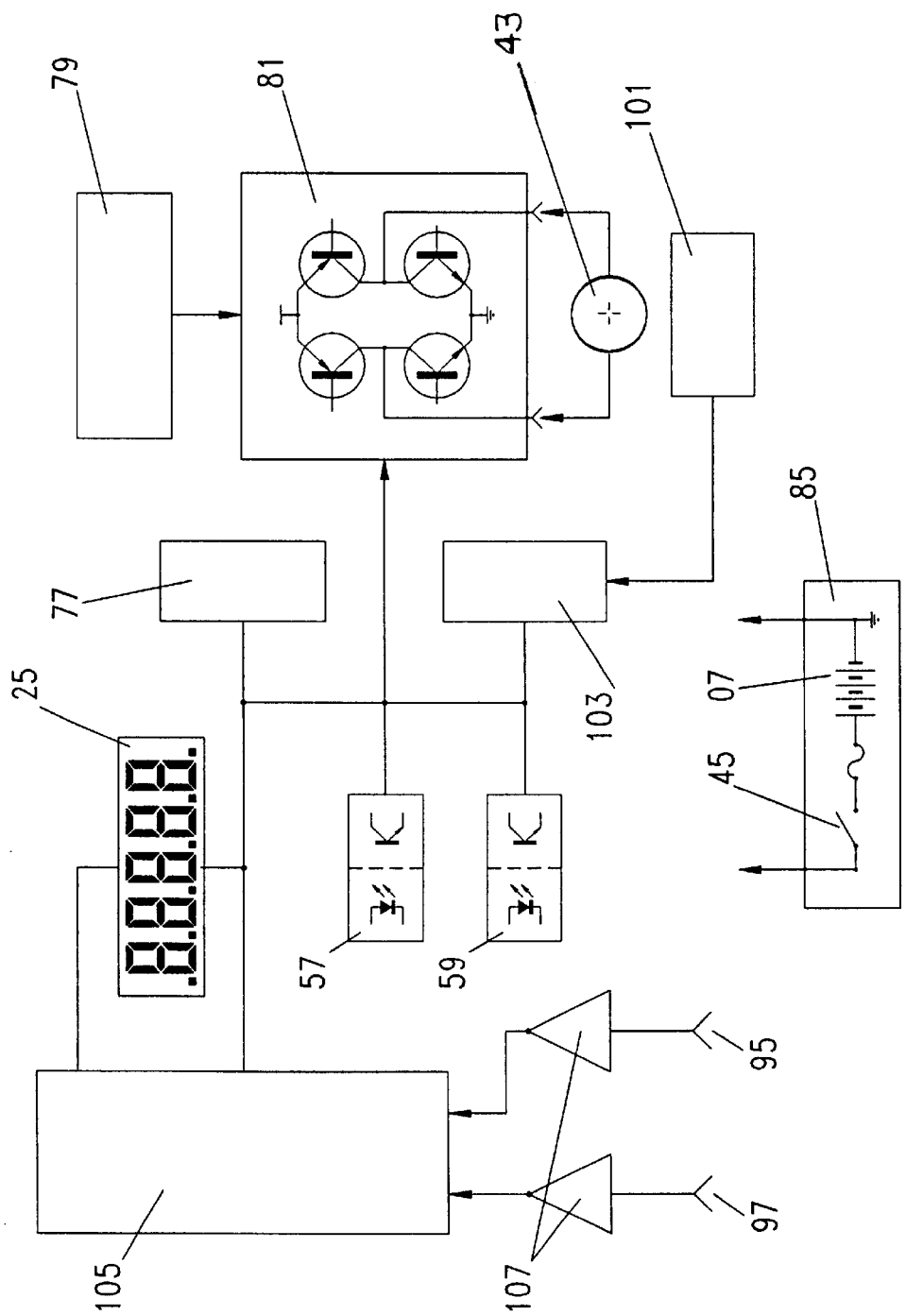
FIG. 7 shows a block diagram of the circuitry for the direction control and digital height readout circuits.

Referring now generally to FIG. 7, as long as the detected voltage signal does not activate the alarm circuit, the automatic search feature causes the search unit 17 to loop up and down. Limit switches 57, 59 are in communication with the motor 43 by means of connectors 95, 97, so that the direction of the motor is reversed when one of the limit switches 57, 59 are activated. The direction change signal is generated by the H bridge circuit 81 in conjunction with the change-over circuit 75, a TTL-TTL/LS 107 and a microprocessor 105.

The digital display 25 is typically used to show the height differential between the laser level line generator 1 scanning plane and the surveyed point. A pulser 101 attached to the motor 43 generates a square wave via RPM rectifier 103 that is sent to microprocessor 105. Microprocessor 105 tracks the movement of search unit 17 through the square waves, and can therefore determine the height of the scanning plane after the plane is located by the search unit 17.

In sum, operation of the automatic laser detecting surveyor's rod 3 is as follows:

A user activates the device with the power on button 45. Presuming that the search unit 17 last stopped while traveling upward, and that no laser signal is detected, the motor 43 will continue to drive search unit 17 upward until it contacts upper limit switch 57. At this point, the direction control circuitry reverses motor 43 so that the search unit travels downward. Again assuming that no signal is detected, the search unit 17 will continue downward until it contacts lower limit switch 59, where the direction of travel will again be reversed.

When the sensors 23 of the search unit 17 detect the laser signal plane, the motor 43 is stopped and the alarm circuit is activated. Activating the alarm circuit triggers the LED display and the audible alarm 93.

If the user wants to manually adjust the height of the search unit 17, he can do so with manual controls 47, 49, which control manual circuit 77. The pass limit function can be overridden by hitting the reset button 29.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. An automatic laser detecting surveyor's rod comprising:

a surveyor's rod, a search unit movably mounted on said surveyor's rod, said search unit comprises at least one detection means, said detection means detects laser light, drive means to move said search unit up and down said surveyor's rod, alarm means, and control means; wherein
      when said automatic laser detecting surveyor's rod is activated by said control means, said search unit is moved by said drive means in a first direction along a travel path until said detection means detects laser light,
      if no laser light is detected before said search unit reaches a first travel limit means, said search unit reverses direction so that said search unit travels in a second direction along said travel path until said detection means detects laser light,
      if no laser light is detected by said search unit traveling in said second direction before said search unit reaches a second travel limit means, said search unit again reverses direction and travels in said first direction, and
      said alarm means is triggered when laser light is detected by said detection means of said search unit.

2. The automatic laser detecting surveyor's rod of claim 1 wherein:

said control means comprises a limiting means to limit a number of cycles said search unit makes without detecting laser light, said limiting means shutting off said drive means when said search unit travels through a specified number of cycles.

3. The automatic laser detecting surveyor's rod of claim 1 wherein:

said control means includes manual controls to control movement of said search unit along said travel path.

4. The automatic laser detecting surveyor's rod of claim 1 wherein:

said drive means comprises an electric motor and a pair of pulleys.

5. The automatic laser detecting surveyor's rod of claim 1 wherein:

a display box is affixed to said surveyor's rod, and a distance and direction of travel of said search unit is measured, so that a height difference between a source of laser light and a surface on which said surveyor's rod is situated is displayed on said display box.

6. The automatic laser detecting surveyor's rod of claim 1 wherein:

said control means comprises means to compare a reference volt age to a detected voltage signal.

7. The automatic laser detecting surveyor's rod of claim 1 wherein:

said control means comprises means an automatic search controller in communication with an H bridge circuit.

8. The automatic laser detecting surveyor's rod of claim 6 wherein:

said H bridge circuit is protected from excess amperage by a limit circuit.

* * * * *